DATA LINK SYSTEM

Filed Dec. 1, 1965 4 Sheets-Sheet 1

INVENTORS
DONALD D. COLEMAN
RAYMOND F. RACINE
BY
Rolf M. Pitts
ATTORNEY

INVENTORS
DONALD D. COLEMAN
RAYMOND F. RACINE
BY Roger M. Pitts
ATTORNEY

DATA LINK SYSTEM

Filed Dec. 1, 1965

INVENTORS
DONALD D. COLEMAN
RAYMOND F. RACINE

BY Roef M. Pitts

ATTORNEY

March 21, 1967 D. D. COLEMAN ETAL 3,310,802

DATA LINK SYSTEM

Filed Dec. 1, 1965 4 Sheets-Sheet 4

INVENTORS
DONALD D. COLEMAN
RAYMOND F. RACINE
BY Rolf M. Pitts
ATTORNEY 3,310,802

DATA LINK SYSTEM

Donald D. Coleman, Garden Grove, and Raymond F. Racine, Orange, Calif., assignors to North American Aviation, Inc.

Filed Dec. 1, 1965, Ser. No. 512,229
12 Claims. (Cl. 343—6.5)

The subject invention relates to a data link system and more particularly to a highly secure data link system useful for private communication and for military IFF (Identification—Friend or Foe) applications.

In the communication between two geographically spaced points by radio or other means using an information-coded carrier frequency, it frequently desired (for purposes of privacy or for military security) to prevent intelligible interception of transmitted information. In the prior art, several methods have been employed with limited success in effecting such security. These prior art methods have included, singly and in combination, highly directive antennas (in the case of radio communication) and a selectively narrow bandwidth about a selected single carrier frequency. However, the alignment of highly directly transmitting and receiving antennas for two stations between which communication is sought, and the avoidance of frequency drift between such (single carrier frequency) stations creates certain practical difficuties. Further, receiving equipment of an eavesdropper or hostile agent may yet be interposed in the intended path of communication and, by means of spectral scanning, or programmable tuning means well known in the art, determine the transmitting frequency for the purposes of message interception or jamming. By means of the concept of the subject invention such difficulties of alignment of highly directive transmitting and receiving means and single-carrier frequency drift of highly-tuned single frequency carrier systems are avoided.

In a preferred embodiment of the subject invention, there is provided transmitting means comprising means for simultaneously generating a first and second programmable carrier frequency between which a selected frequency difference exists, means for commonly amplitude-modulating or information-coding such two carrier frequencies prior to directive transmission of the same in a selected direction. There is also provided omni-directional receiving means responsive to the two transmitted carriers and comprising a nonlinear detector for providing an output indicative of the beat frequency difference between the two received, information-coded carriers, and a band-pass-limited video detector coupled to the nonlinear detector and having a center frequency equal to the frequency difference between the carriers.

In normal operation of the above-described arrangement, a video-detected receiver output is provided, the envelope of which corresponds to the information coding transmitted by the cooperation of the modulation means. Hence, by means of such programmable multiple carrier frequency signalling arrangement, frequency coding is provided in the form of that frequency difference between the two programmed carriers to which the video detector responds. Because multiple frequency transmission and receiving is employed, essentially broadband RF equipment is utilized, thereby avoiding frequency drift problems associated with highly tuned, single carrier frequency systems. Additional coding in the form of amplitude, or pulse modulation, coding may be provided for security purposes.

Also, the random-like selective variation or programming of the two carrier frequencies, between which a selected frequency difference is maintained, provides a security measure and anti-jam feature, while the selected difference frequency and associated receiver center frequency provide frequency-coding. Further, the difference frequency and receiver center frequency may be concomitantly adjusted or varied by pre-arrangement to effect additional security measures, or to increase the effective number of channels obtainable within a given transmission bandwidth. Moreover, such frequency-coded multiple frequency transmission may be pulse-coded and injected into the directional antenna of a radar system, utilized in cooperation with a receiver constructed in accordance with the inventive concept, together with a decoder and suitable transponder, for interrogating for IFF purposes only those potential radar targets actually under radar surveillance. Accordingly, it is an object of the subject invention to provide an improved data link system.

It is another object of the invention to provide a data link system having an improved degree of security.

It is yet another object of the invention to provide a secure data link employing a programmable pair of commonly modulated carrier frequencies.

It is still another object of the invention to provide a frequency-coded link responsive to the envelope of the beat frequency difference between two commonly-modulated, simultaneously-transmitted carrier frequencies.

It is a further object of the invention to provide pulse-coded and frequency-coded multiple carrier means co-operating with the directional antenna of a search radar system and with the pulse-decoder and transponder of a detected target for identification purposes.

These and other objects of the invention will become apparent from the following description, taken together with the accompanying drawings in which.

In the figures, like reference characters refer to like parts.

Figure 1:
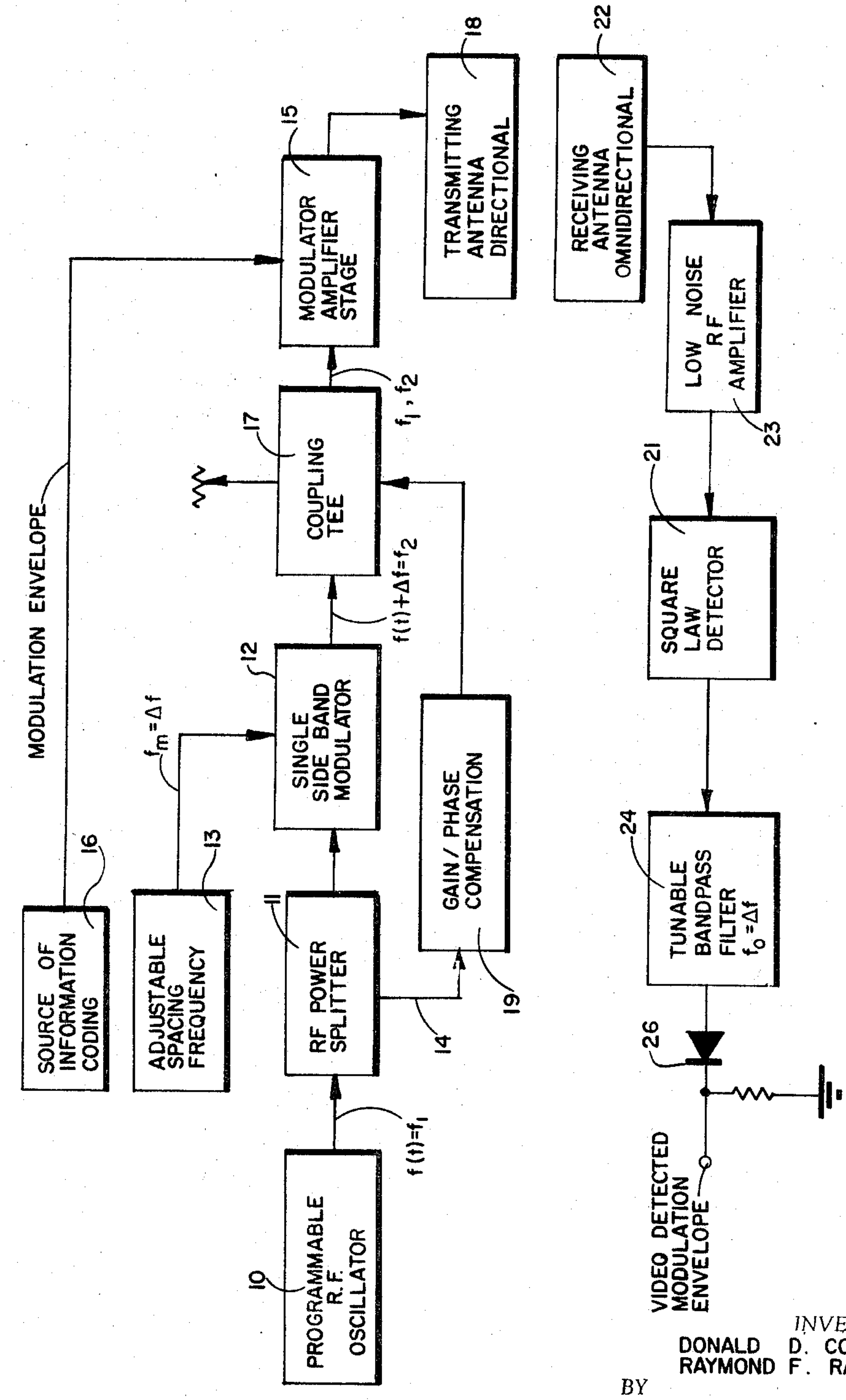
FIG. 1 is a block diagram of a system embodying the concept of the invention.

Referring now to FIG. 1, there is illustrated a block diagram of a system embodying the inventive concept. There is provided means 10 for generating a programmable first RF frequency-to-be-modulated $f_1$, coupled through an RF power splitter 11 to single side band means 12, which is responsive to a source 13 of a modulating or spacing frequency $\Delta f$ for frequency-translating the RF frequency to a second RF frequency, $f_2=f_1+\Delta f$. Pulse modulation means, comprising a modulation-amplifier stage 15 responsively connected to a source 16 of a modulating signal is coupled to modulator 12 and a second output 14 of RF power splitter 11 by means of a coupling T (or hybrid tee) 17 for commonly modulating the first and second RF frequencies $f_1$ and $f_2$. The commonly-modulated, dual-frequency RF output of modulator 15 is coupled to a transmitting antenna 18.

Where required, an RF amplifier stage 19 may be interposed between phase splitter output 14 and T 17 to provide gain and phase compensation (or signal-tracking) of such signal channel, relative to the frequency-sensitive attenuation characteristics of the modulator 12 in the second channel input to T 17. In other words, it is preferable that the two inputs to T 17 be of substantially the same amplitude or energy level, for reasons which will become more apparent hereinafter.

There is further provided in the arrangement of FIG. 1, receiving apparatus responsive to the above described dual frequency transmission and comprising a square law detector or mixer 21 coupled to a receiving antenna 22 and providing an output, one component of which is indicative of the beat frequency difference between the two received frequencies. Where required, an RF amplifier 23 stage may be interposed between receiving antenna 22 and detector 21 for assuring a high enough energy level to obtain mixing or beat frequency components. A bandpass filter 24 having an input coupled to the output of square law detector 21, and having a center frequency $f_o$ corresponding to the spacing frequency $f_m$ (of source 13) provides an output indicative of the beat frequency difference between the two received frequencies; the envelope of which output (detected by video detector 26) represents the modulation envelope of the two commonly modulated RF frequencies transmitted by antenna 18.

Hence, even though RF frequencies $f_1$ and $f_2$ are programmed or commonly varied by the programming of $f_1$, the cooperation of bandpass filter 24 and square law detector 21 will yet respond to provide a receiver output indicative of the transmitted, dual-frequency modulation envelope, as long as the center frequency of filter 24 is equal to the spacing frequency of oscillator 13. In addition, the dual transmission frequencies employed should preferably commonly lie within the bandwidths of the transmitting and receiving antennas 18 and 22.

Additional dual frequency channels or pairs of frequencies may be accommodated within the common bandwidth of a selected pair of transmitting and receiving antennas by employing different values for the spacing frequency $f_m$ and correspondingly adjusting the center frequency of the receiver output filter. Further, an additional degree of security may be provided, if desired, by selectively adjusting the like spacing and center frequencies in a prearranged manner.

Because of the utilization of a beat freuency component, developed in the reception and processing of the dual freuency transmission, the compensatory amplifier 19 may be utilized to the arrangement of FIG. 1 in order to assure satisfactory energy ratios whereby such beat frequency component may be conveniently evolved in the receiver arrangement of FIG. 1. However, such compensatory element may be obviated by the more symmetrical arrangement of an alternate embodiment shown more particularly in FIG. 2.

Figure 2:
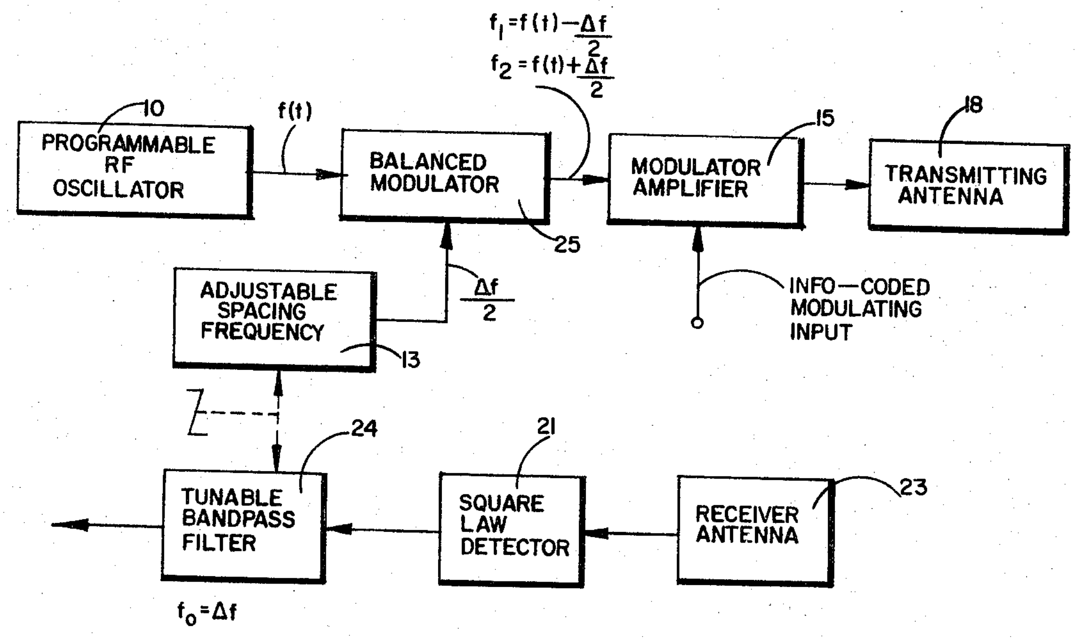
FIG. 2 is a block diagram of an alternate embodiment of the multiple frequency transmitter of FIG. 1.
Figure 3:
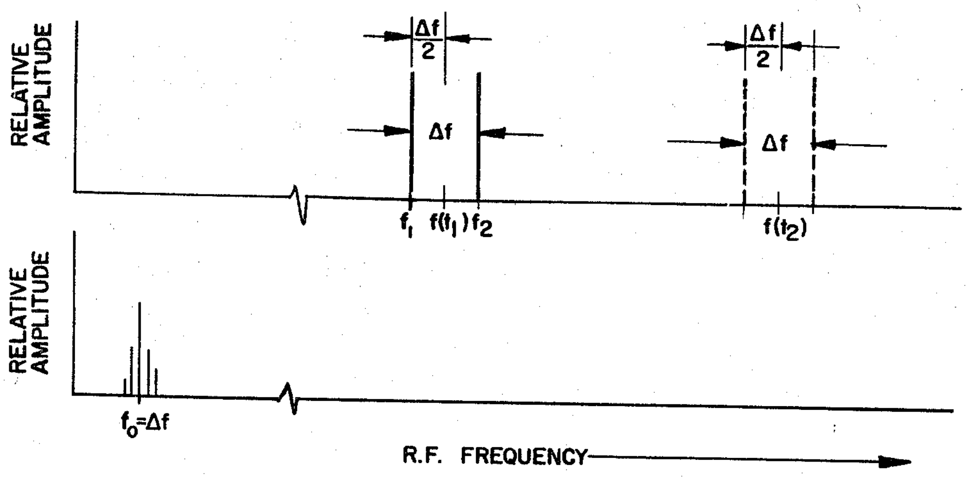
FIG. 3 is a family of spectral diagrams of the responses of several elements of the system of FIG. 1.

Referring now to FIG. 2, there is illustrated an alternate embodiment of the dual frequency generator of FIG. 1, and employing a balanced modulator 25, in lieu of the power splitter and single side band means of FIG. 1. In such arrangement of FIG. 2, the output of balanced modulator 25 is a suppressed carrier, dual-frequency output, corresponding to the sum of and difference between the two input frequencies $f(t)$ and $\Delta f/2$, (i.e., $f_1=f(t)+\Delta f/2$, and $f_2=f(t)+\Delta f/2$, whereby the spacing frequency $$(f_1-f_2)=\Delta f$$

as shown more particularly in FIG. 3.

Referring to FIG. 3, there is shown a family of spectral responses for transmitter modulator 25 and receiver bandpass filter 24 of FIG. 1. For a programmable or time-varying RF input $f(t_1)$ and a spacing frequency input of $\Delta f/2$, modulator 25 of FIG. 2 provides two output spectral lines in FIG. 3 at $f_1$ and $f_2$, spaced apart in frequency by $(f_1-f_2)=\Delta f$, twice the input frequency from oscillator 13.

The beat frequency difference between the dual transmission frequencies $f_1$ and $f_2$, after nonlinear detection and bandpass filtering at a center frequency $f_o$ equal to the spacing, or beat, frequency $\Delta f$, provides a series of spectral lines in FIG. 3 about $f_o$, the spectral spread representing the upper and lower sideband effects of the amplitude modulation envelope imparted by modulation-amplifier 15 in FIG. 2. If the time varying input frequency $f(t)$ to modulator 25 from oscillator 10 varies from $f(t_1)$ to $f(t_2)$, as indicated in FIG. 3, the frequency difference $\Delta f$ between the dual transmission frequencies still results in a beat frequency output of fixed frequency $f_o$ from receiver-filter 24 in FIG. 2.

Accordingly, it is to be appreciated that the arrangements of FIGS. 1 and 2 provide a secure signalling system, employing programmable, commonly modulated (information coded) dual transmission frequencies, and square law detection and bandpass limited receiver means for providing a bandpass limited receiver output corresponding to the beat frequency difference between the programmable dual frequencies, and having an envelope corresponding to the information coding thereof. The security of such arrangement arises from the programming or time-varying nature of the dual transmission frequencies utilized, and from the additional frequency-coding or selected frequency spacing maintained between the dual transmission frequencies and employed as the center frequency of the limited bandpass of the beat frequency received.

Such secure signalling concept may be efficiently employed in an IFF (Identification—Friend or Foe) application, in cooperation with a military tracking radar, in a manner to be described more fully hereinafter. In the prior art of military IFF radio systems, a pulse code modulation or interrogate code, is transmitted by an omni-directional transmitting antenna to interrogate potential targets in an area in which the interrogator is situated. A "friendly" IFF transponder in the area, upon receiving the interrogate code, decodes the received signal to see if it corresponds to a selected or prearranged "code of the day." In response to a received interrogate signal, properly coded in the code of the day, the IFF transponder transmits a second preselected pulse code, or transponder code, via an associated omni-directional antenna. Such transponder code may be selected to be different from the interrogate code, for reasons of security, whereby a hostile ordinary transponder may not merely receive, delay and retransmit an interrogate code and thereby palm itself off as a friendly station. Accordingly, the interrogating station requires a transponder decoder in cooperation with its receiver for determining whether an interrogated transponder has responded with a preselected transponder code of the day. In other words, an IFF system comprising an interrogator and an interrogated transponder employs an interrogate coder, interrogate decoder, transponder coder and transponder decoder.

A principal disadvantage of such prior art IFF systems, when used in conjunction with a weapon-aiming airborne radar, is that the omni-directional properties thereof may result in interrogations of other than a target of interest, or may receive responses to other than interrogations made by one's own interrogator. Also, IFF receivers must employ omni-directional antennas, because it cannot be known, a priori, from which direction an interrogation may be received. Further, the performance of such single-carrier frequency systems is of limited reliability due to the possibility of mutual drift between two stations of a like single carrier frequency, whereby a transponder failure to receive an interrogator signal, or a failure of an interrogator to receive a transponder response due to frequency drift of one of them, may result in a misidentification of a friendly area as hostile. Additionally, such single-carrier, fixed-frequency transmission is susceptible to frequency identification and either jamming or, alternatively, simulation of the codes employed.

Figure 4:
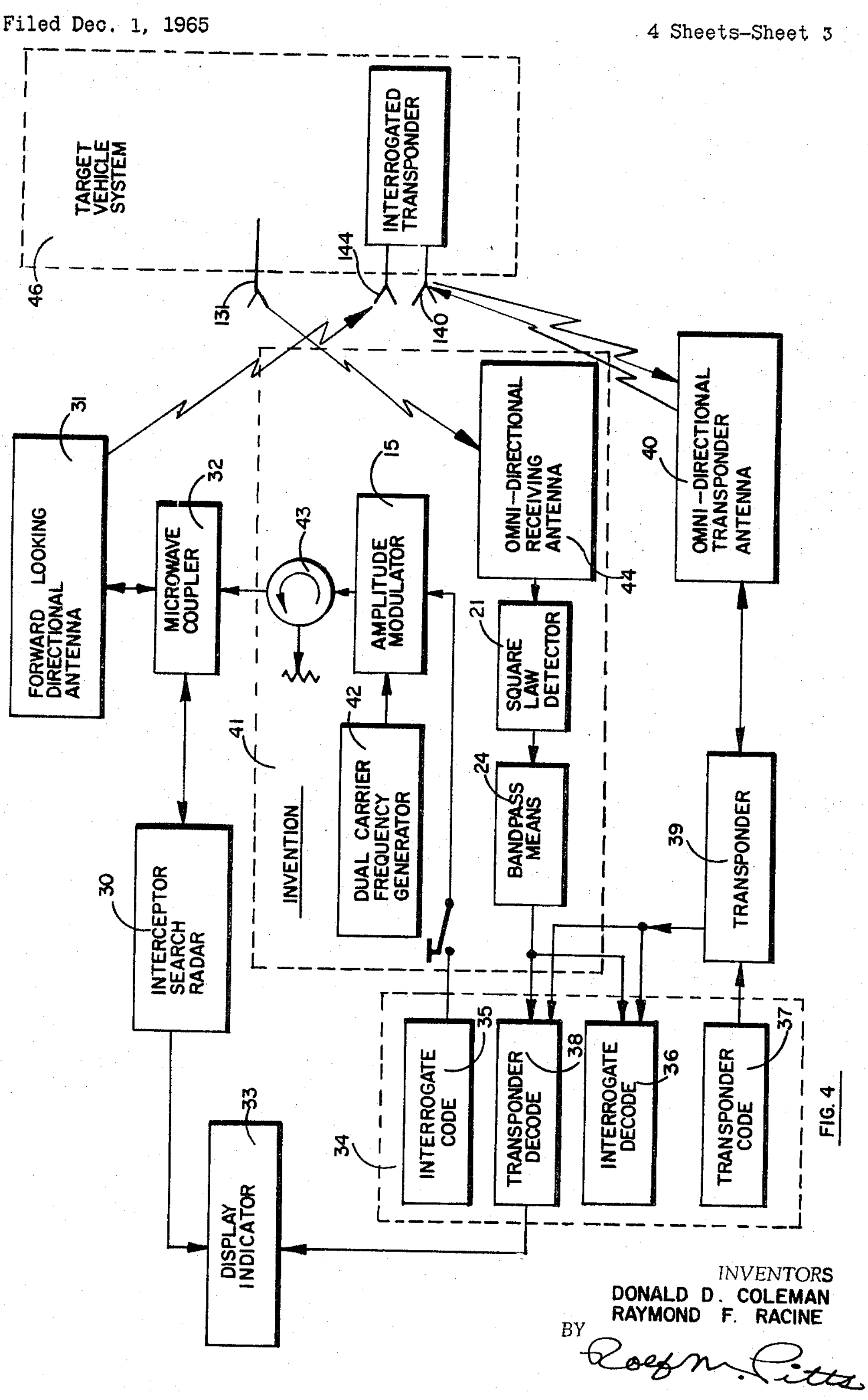
FIG. 4 is a block diagram of a radar system utilizing the device of the invention.

Such disadvantages of prior art IFF systems may be avoided by employing the concept of the subject invention in cooperation with the search-and-track radar of a weapon vehicle, as shown more particularly in FIG. 4.

Referring now to FIG. 4, there is illustrated a block diagram of a search radar system utilizing the device of the invention. There is provided a radar system 30 coupled to a forward-looking directional antenna 31 (which may or may not be of the scanning type) by means of a microwave coupler 32, and cooperating with a display indicator 33 (such as a PPI device) for providing an indication of targets detected by such radar system. Antenna 31, radar 30 and indicator 33 may be constructed and arranged in any manner well understood in the art, and adapted, for example, for airborne utilization on a military interceptor type aircraft; and therefore such elements are shown in block form only. There is also provided IFF code means 34 comprising an interrogator coder 35, interrogator decoder 36, transponder coder 37, and transponder decoder 38, all constructed and arranged in a manner well understood in the art. Because such assembly is known in the IFF art and does not constitute an inventive element of the concept of the invention, such assembly is shown in block form only. The transponder coder 37 of code box 34 may be arranged to cooperate with a single-frequency transponder 39 and omni-directional antenna 40 for the transmission of coded transponder signals in response to interrogate signals received at antenna 40 from a prior art single carrier frequency IFF interrogator and decoded by decode box 37. Alternatively, transponder 39 transmits coded single carrier transponder signals in response to dual carrier frequency interrogate signals received by an omni-directional receiver portion of a subsystem device 41 embodying the dual carrier frequency concept of the invention.

Subsystem 41 comprises a dual frequency transmitter and receiver arranged to cooperate substantially the same as the arrangement of FIG. 2. The transmitter portion of subsystem 41 in FIG. 4 comprises a programmable dual carrier frequency generator 42 corresponding to elements 10, 13, and 25 of FIG. 2, and a modulator 15 corresponding to the like referenced element of FIG. 2, the modulating signal input to modulator 15 being provided by interrogate coder 35. The coded output of modulator 15 is coupled to directional radar antenna 31 through microwave coupler 32 by means of circulator 43 for transmission purposes. The receiver portion of subsystem 41 is comprised of an omni-directional receiving antenna 44 responsive to a received pair of commonly modulated carrier frequencies, and cooperating with a square law detector 21 and bandpass means 24 having a center frequency adjusted to the frequency difference between the pair of received interrogator frequencies, for providing an output signal having a modulation envelope corresponding to the common modulation of the selected pair of received frequencies. Such envelope may be detected by an appropriate one of decoder elements 36 and 38, in the manner of video detector 26 of FIG. 1, incident to further processing or decoding, as is well understood in the art.

The output of bandpass means 24 may be fed to interrogate decoder 36 for determining whether the modulated dual carriers received by antenna 44 bear the interrogate code of the day. Where the difference frequency coding of the received dual frequencies (and the center frequency of bandpass means 24) has been selected as being equal to the lower frequency employed by the single carrier IFF transponder 39 of the prior art, then the output of bandpass means 24 may be conveniently coupled into IFF code assembly 34 by means of couplers interposed between the outputs of transponder 39 and bandpass 24 and a respective input of code assembly 34, the arrangement of which couplers is well understood in the art.

In normal operation of the arrangement of FIG. 4, the cooperation of the dual carrier frequency interrogator with the directional antenna 31 associated with radar system 30, assures that only targets within the surveillance of the narrow beamwidth of directional antenna 31 will be interrogated. Also, because of the directional properties of the interrogating antenna 31, such interrogations may be conducted at greater ranges than heretofore. Further, such directional properties of interrogating antenna 31 provide a degree of security, relative to hostile "listening" equipment located out of the surveillance volume under the surveillance of the radar antenna 31. Moreover, a selected one of the targets detected by radar system 30 may be more confidently identified. For example, consider a target vehicle system, indicated in FIG. 4 as dotted box 46, similarly equipped as the system shown in detail in FIG. 4, and including an antenna 144 (corresponding to element 44 in block 41) and an associated nonlinear receiver responsive to the coded dual frequency interrogator carrier transmitted by antenna 31. In response to the received interrogator code, the interrogated transponder of target vehicle system 46 will omni-diectionally transmit a transponder code on antenna 140, corresponding to antenna 40 of the system shown in detail.

Figure 5:
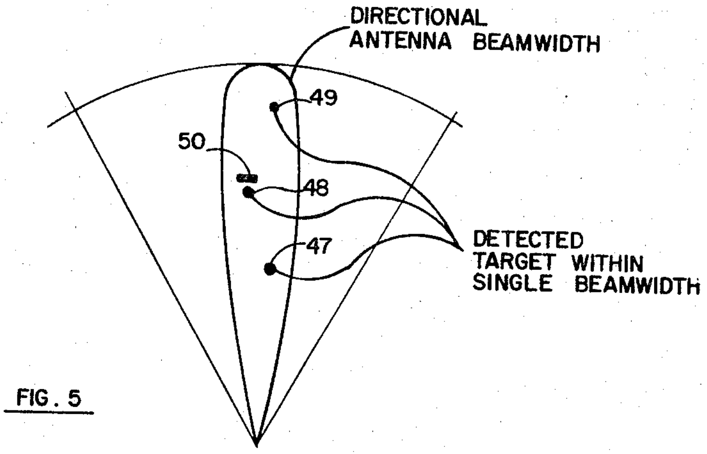
FIG. 5 is a representation of a PPI display of a plurality of detected targets and depicting a display marker distinguishing a target identified by means of the invention.
Figure 6:
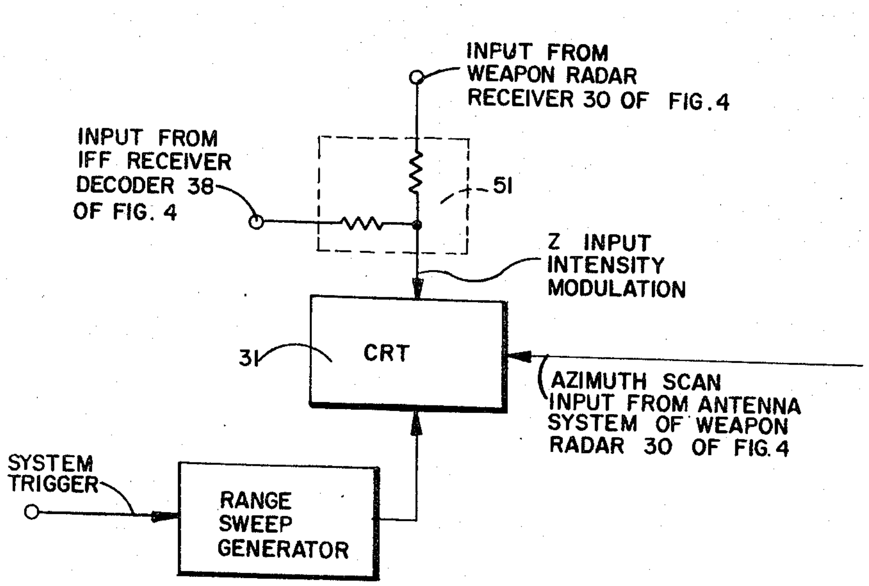
FIG. 6 is an exemplary arrangement of means for effecting the display marker shown in FIG. 5.

Transponder 39, in response to the transponder signals received by antenna 40 from the interrogated transponder, provides an input signal to transponder decoder 38. Where the interrogated transponder of target vehicle system 46 has responded with the correct transponder code, decode means 38 provides an output signal so indicative, which may be used for identification purposes on display indicator 33, if desired. For example, where display indicator 33 is a PPI display, of the type well understood in the art, the azimuth direction and range of a target detected by a highly direction, azimuthally scanning antenna are displayed as shown in FIG. 5. Targets lying in a common direction corresponding to a given beamwidth direction of antenna 31, are radially separated on the display, the earlier received echoes of the energy transmitted by radar system 30 (of FIG. 4) corresponding to the nearer target 47 shown in FIG. 5, and the later received echoes corresponding to the farther or more-distant target 49 shown in FIG. 5. Where one of the detected and interrogated targets represented by such display, is suitably equipped in the manner described in connection with the description of FIG. 4, a decoded transponder signal will be received from such target 48 subsequent to the received echo therefrom, identifying such target as a friendly target. The delay of the received transponder signal relative to the received target echo signal corresponds to the reaction time of the friendly target vehicle's transponder. Hence, where such decoded transponder signal is applied as an ancillary display signal to the Z or intensity modulation input of the display indicator, the resulting display is a marker near to, in back of, and in the same direction as the display point corresponding to the detected and interrogated friendly target, as shown by marker 50 adjacent to target 48 in FIG. 5. Such modulation of the PPI display of FIG. 5, may be achieved by combining the output of transpond decoder 38 with the intensity modulation input to the display indicator 31 from radar system 30, by signal summing means 51 as shown in FIG. 6, or by like means known in the art for supplementing the intensity modulation control of indicator 31.

Where the target vehicle system 46 of FIG. 4 is equipped with a dual carrier interrogator cooperating with an antenna 131, the interrogation signal is received by antenna 44, and the interrogation code recovered by the cooperation of detector 21 and bandpass means 24 in subsystem 41 of FIG. 4. Such interrogation code is decoded by decoder 36, causing transponder coder 37 to excite transponder 39, and modulate the single frequency carrier transmitted by the cooperation of transponder 39 and antenna 40.

Accordingly, there has been described an improved, highly secure data link comprising a highly directional IFF system for cooperation with a tracking radar and utilizing the directive antenna thereof for interrogation purposes. Such data link employs a programmable pair of commonly modulated carrier frequencies, between which a selected frequency difference is maintained. Such programmable characteristic provides both a measure of security and an anti-jam feature, while the frequency difference is employed as the center frequency of the bandpass limited output of a mixer-receiver for recovering the modulation envelope or information code.

Although the device has been described as employing a pulse code modulation for IFF interrogation purposes in cooperation with prior art transponder systems, the utilization of the invention for such purposes is not so limited and need not rely upon such prior art single carrier frequency type transponders. Also, although the invention, as applied is a highly directive IFF application in cooperation with a search radar, has been described as employing a pulse modulation code for information coding, the device of the invention is not so limited. It is clearly apparent that a highly secure voice link may be achieved by employing audio modulation of the dual carrier frequency transmitted by radar antenna 31 in FIG. 4, and that such modulation envelope may be recovered by video detection of the output of receiver bandpass means 24. In this way, the interrogator may identify himself while in the course of interrogating a target in a selected direction. In a preferred utilization of the concept of the invention, both pulse code modulation and audio modulation may be employed.

For example, a second or separate spacing frequency in the dual carrier frequency generator and a corresponding center frequency in a second receiver bandpass filter may be employed for directional voice communication for further identification of a selected radar target subsequent to detection and identification of such target with the combined radar and pulse-coded IFF means of FIG. 4. In a highly intricate field maneuver or tactic involving a number of vehicles, it is often necessary to not only determine if a "friend" is at a given location, but to also determine if a given friend is at such preselected location. Such function may be conveniently achieved by audio modulation of the dual carrier system of FIG. 4 in a voice link application. However, although pulse code modulation and audio modulation in cooperation with a radar system provide a secure data link for IFF purposes, such system may yet find utility in other applications such as harbor control or air traffic control and the like, wherein a master interrogator and surveillance radar are ground based at a stationary point. Moreover, although the device of the invention has been described in connection with a radio energy type system, it is clearly apparent that the inventive concept is not so limited and that it may be employed with other types of signalling systems.

Although the invention has been illustrated and described in detail, it is to be clearly understood that the same is by way of illustration and example only and is not to be taken by way of limitation, the spirit and scope of this invention being limited only by the terms of the appended claims.

We claim:

1. In a secure signalling system, the combination comprising balanced modulator means having a first and second input responsive to a first source of a programmable carrier-frequency and a second source of a modulated frequency respectively for providing a suppressed carrier output comprising a first and second programmable carrier frequency;

information-coded modulation means coupled to said balanced modulator means for commonly modulating said first and second carrier frequencies; and directional transmitting means in cooperation with said modulation means for transmitting said information-coded carrier frequencies in a selected direction.

2. The device of claim 1 in which there is further provided an omni-directional receiving antenna responsive to said transmitted, modulated carrier-frequencies;

non-linear detection means responsively coupled to said antenna; and bandpass limited means responsively coupled to said detection means and having a center frequency equal to said modulating frequency.

3. In a secure signalling system, the combination comprising means for generating a first carrier frequency-to-be-modulated, single side band means responsive to a modulating frequency for frequency translating said first carrier frequency to a second carrier frequency, information-coded modulation means coupled to said first and second mentioned means for commonly modulating said first and second carrier frequencies, and directional transmitting means in cooperation with said modulation means for transmitting said information coded carrier frequencies in a selected direction.

4. The device of claim 3 in which there is further provided an omni-directional receiving antenna responsive to said first and second carrier frequencies, non-linear detection means responsively coupled to said antenna, and bandpass limited video detection means responsively coupled to said detection means and having a center frequency equal to said modulating frequency.

5. The device of claim 3 in which said first mentioned means is programmable, whereby selected first and second carrier frequencies are provided and between which a frequency difference exists, corresponding to said modulating frequency.

6. The device of claim 3 in which there is included means for selectively adjusting said modulaing frequency.

7. A secure signalling system, comprising in combination progammable means for generating a first carrier frequency;

a selectively adjustable source of a selected modulating frequency;

single side band means having a first and second input responsive to said first carrier frequency and said modulating frequency respectively for providing a second carrier frequency;

modulation means connected to commonly modulate said first and second carrier frequencies and having a further input adapted to be connected to a source of a modulating signal;

directional transmitting means coupled to said modulation means for transmitting said commonly modulated carrier frequencies in a selected direction; and compensation means interposed in circuit between said programmable means and said modulator for compensating for differential phase shifts inserted between said first carrier frequency and the single sideband modulated first carrier frequency by said single sideband modulating means.

8. The device of claim 7 in which there is further provided a signal receiver comprising non-linear detection means responsive to said transmitted, commonly-modulated carrier frequencies; and bandpass limited video detection means responsively coupled to said detection means and having a selectively adjustable center frequency for providing an output signal corresponding to the envelope of the beat frequency difference between said two transmitted carriers.

9. In a secure signal translating system for the transmission of two commonly-modulated carriers, the combination comprising a square law detector responsive to said carriers, bandpass limited means responsively coupled to said detection means and having a selectively adjustable center frequency corresponding to the beat frequency difference between said carriers, and video detection means responsively coupled to said bandpass limited means for providing a video output envelope corresponding to the modulation of said commonly modulated carriers.

10. In cooperation with a forward looking radar system, coded signalling means comprising means for generating a programmable first RF frequency-to-be-modulated, single-sideband means responsive to a modulating frequency for frequency translating said RF frequency to a second RF frequency, pulse modulation means coupled to said first and second mentioned means for commonly modulating said first and second RF frequencies, the output of said pulse modulation means being drivingly coupled to a directional antenna of said radar system.

11. The device of claim 10 in which then is further provided an omni-directional receiving antenna responsive to said first and second frequencies, a non-linear detection means responsively coupled to said antenna, and bandpass limited video detection means responsively coupled to said non-linear detection means and having a center frequency equal to the difference between said first and second frequencies.

12. In cooperation with a radar system having a directional antenna and display indicator, means for identifying a selected one of said group of targets, comprising a dual carrier frequency generator located at said radar system for generating two carrier frequencies having a selected frequency difference and both of which frequencies are within the bandwidth of said directional antenna;

modulation means intercoupling said generator and said antenna, for commonly modulating and transmitting said two carrier frequencies;

bandpass limited receiving means located at said selected one of said targets and responsive to the beat frequency difference between said two commonly modulated carrier frequencies for providing a transponder control signal;

transponder means located at said selected target and responsive to said control signal for transmitting a selectively coded identifying signal; and receiver means located at said radar system and responsive to said transmitted selectively coded signal for providing an input to said display indicator for identifying said selected target.

References Cited by the Examiner

UNITED STATES PATENTS

| | | | |
|---|---|---|---|
| 3,020,398 | 2/1962 | Hyde | 325—105 X |
| 3,122,737 | 2/1964 | Setrin | 343—6.5 |

RODNEY D. BENNETT, *Primary Examiner.*

CHESTER L. JUSTUS, *Examiner.*

D. C. KAUFMAN, *Assistant Examiner.*